(12) United States Patent
Lemus

(10) Patent No.: US 9,369,547 B2
(45) Date of Patent: Jun. 14, 2016

(54) TRANSCODING ON VIRTUAL MACHINES USING MEMORY CARDS

(71) Applicant: Disney Enterprises, Inc., Burbank, CA (US)

(72) Inventor: Matthew Lemus, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 361 days.

(21) Appl. No.: 13/785,681

(22) Filed: Mar. 5, 2013

(65) Prior Publication Data

US 2014/0258558 A1  Sep. 11, 2014

(51) Int. Cl.
*G06F 15/16* (2006.01)
*H04L 29/06* (2006.01)

(52) U.S. Cl.
CPC .............. *H04L 69/02* (2013.01); *H04L 65/604* (2013.01); *H04L 65/80* (2013.01)

(58) Field of Classification Search
CPC ........... H04L 1/00; H04L 67/06; H04L 67/20; H04L 67/28; H04L 69/04; H04L 69/08; H04L 69/10; H04L 69/18; H04L 69/24
USPC ........................................................ 709/246
See application file for complete search history.

(56) References Cited

U.S. PATENT DOCUMENTS

| | | | |
|---|---|---|---|
| 6,141,744 A * | 10/2000 | Wing So .......................... | 712/35 |
| 8,136,100 B1 * | 3/2012 | Goldman ...................... | 717/136 |
| 8,464,249 B1 * | 6/2013 | Goldman et al. ............. | 717/176 |
| 2006/0174304 A1 * | 8/2006 | Kim et al. ...................... | 725/116 |
| 2008/0126449 A1 * | 5/2008 | Haitsma ........................ | 707/205 |
| 2008/0127169 A1 * | 5/2008 | Malasky et al. ............... | 717/174 |
| 2008/0127170 A1 * | 5/2008 | Goldman et al. ............. | 717/174 |
| 2008/0129864 A1 * | 6/2008 | Stone et al. ................... | 348/468 |
| 2008/0273095 A1 * | 11/2008 | Koike et al. ............... | 348/231.7 |
| 2009/0259462 A1 * | 10/2009 | Wildfeuer et al. ............. | 704/226 |
| 2010/0011014 A1 * | 1/2010 | Odulinski et al. ............. | 707/101 |
| 2010/0319017 A1 * | 12/2010 | Cook .............................. | 725/31 |
| 2011/0083157 A1 * | 4/2011 | Addair ......................... | 725/120 |
| 2011/0102677 A1 * | 5/2011 | Kanda .......................... | 348/563 |
| 2011/0179196 A1 * | 7/2011 | Friedman ....................... | 710/22 |
| 2011/0252420 A1 * | 10/2011 | Tung et al. ...................... | 718/1 |
| 2013/0047150 A1 * | 2/2013 | Malasky et al. ............... | 717/176 |
| 2013/0315505 A1 * | 11/2013 | Atkins et al. ................. | 382/300 |
| 2014/0313278 A1 * | 10/2014 | Periyannan et al. ....... | 348/14.08 |
| 2014/0351871 A1 * | 11/2014 | Bomfim et al. ................ | 725/93 |

* cited by examiner

*Primary Examiner* — Douglas Blair
(74) *Attorney, Agent, or Firm* — Patterson + Sheridan LLP

(57) ABSTRACT

The present embodiments disclose techniques for transcoding media data using a virtualized network environment. This virtual environment may be hosted on one or more memory cards which each contain one or more memory chips. For example, the memory cards may include plurality of interconnected memory elements mounted on a PCB. The virtual environment may include virtual machines that execute applications that transcode the media data from one format to a different format. Because each virtual machine acts like an independent physical machine, a plurality of transcode operations may be performed in parallel on respective virtual machines. By virtualizing the transcode process, the hardware required for transcoding can be reduced relative to using a dedicated data center for transcoding the media data.

20 Claims, 5 Drawing Sheets

TRANSCODING ON VIRTUAL MACHINES USING MEMORY CARDS

BACKGROUND

1. Field of the Invention

Embodiments described herein generally relate to transcoding media data, or more specifically, to transcoding audio/visual data in a virtualized network environment.

2. Description of the Related Art

The process of transcoding is a direct digital-to-digital data conversion from one encoding to another. Transcoding is typically performed on video or audio files. In some examples, transcoding converts a compressed audio or video file from one format into another compressed file implementing a different format. Content providers (e.g., movie studios, recording studios, television studios, broadcast company, etc.) generate audio or video files in a base (e.g., raw) format. However, distribution networks (e.g., internet service providers, television broadcast networks, cable providers, streaming services, and the like) may require these files to be in a different format. For example, the content provider may use a different encoding of a video file when transferring the file on distribution network implementing a TCP/IP network (e.g., the Internet) as compared to a distribution network that broadcasts the video file over the air.

To generate the different encodings required for a particular audio or video file, content providers may use data centers dedicated to transcoding the files. These data centers typically include multiple servers, racks, network devices, and the like. As such, the data centers require extensive capital investment as well as incurring significant operating costs (e.g., electricity costs, personnel costs, cooling, etc.). Accordingly, the costs associated with transcoding video and audio files may be a significant business expense for content providers and/or distributers.

SUMMARY

Embodiments of the present disclosure include a method and a computer program product for transcoding a media file in a virtual environment. The method and computer program product store the media data in the virtual environment where the virtual environment is hosted on one or more memory cards comprising solid-state memory elements. The method and computer program product transmit a plurality of portions of the media data from a virtual storage element in the virtual environment to a virtual machine in the virtual environment and transcode the plurality of portions of the media data from a first format to a second format using the virtual machine where the portions are transcoded sequentially by the virtual machine. The method and computer program product transmit the plurality of transcoded portions of the media data from the virtual machine to the virtual storage element.

Another embodiment of the present disclosure is a chassis which includes a computer processor and a memory card comprising one or more solid-state memory elements storing a program that, when executed on the computer processor, performs an operation for transcoding media data in a virtual environment. The operation includes storing the media data in the virtual environment, wherein the virtual environment is hosted, at least in part, on the memory card and transmitting a plurality of portions of the media data from a virtual storage element in the virtual environment to a virtual machine in the virtual environment. The operation further includes transcoding the plurality of portions of the media data from a first format to a second format using the virtual machine where the portions are transcoded sequentially by the virtual machine. The operation includes transmitting the plurality of transcoded portions of the media data from the virtual machine to the virtual storage element.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

Figure 1:
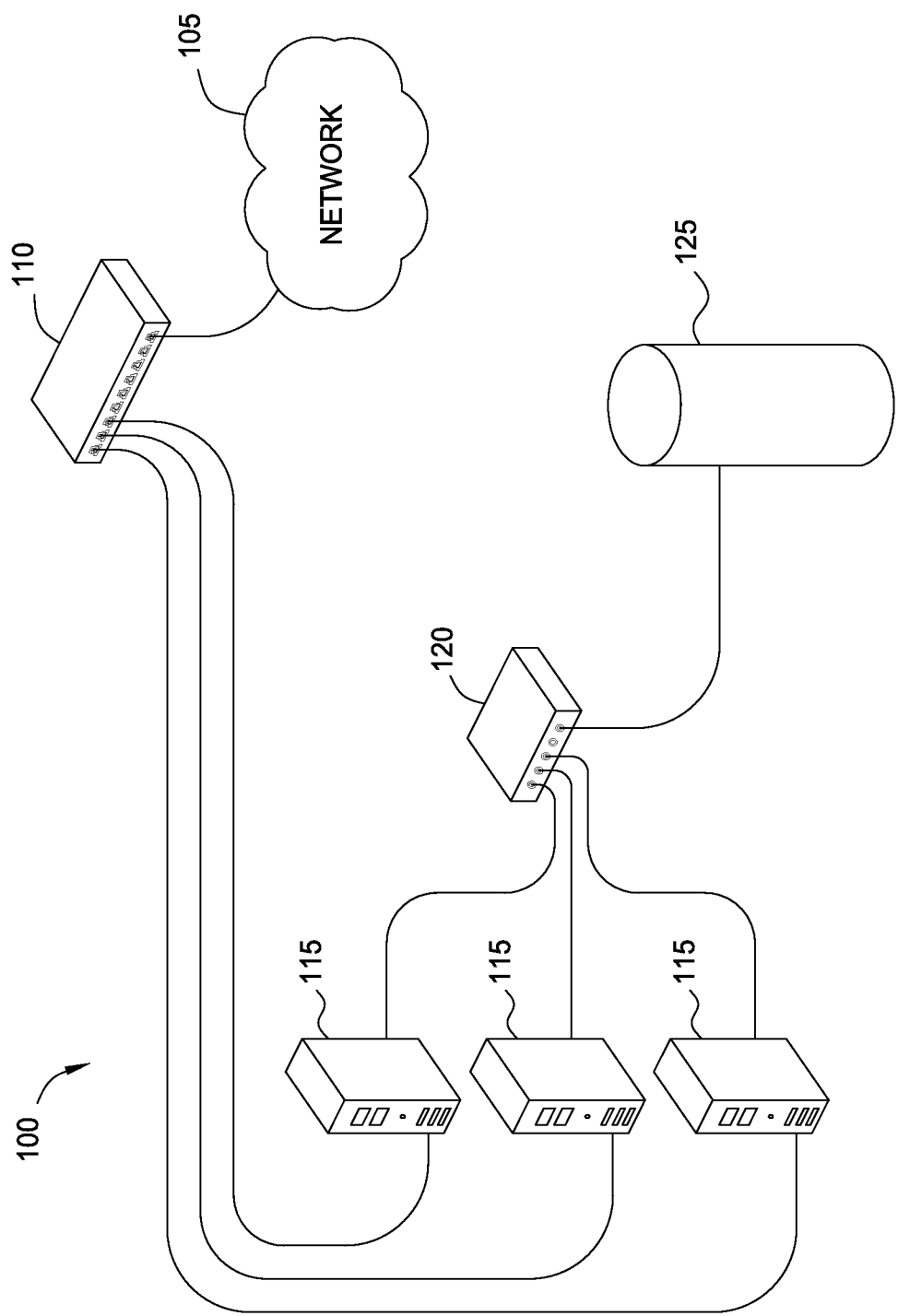
FIG. 1 illustrates a system containing a data center for transcoding audio or video files, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The present embodiments disclose a technique for transcoding audio and video files (referred to herein as "media files" or more generally as "media data") using a virtualized network environment containing one or more virtual machines. This virtual environment may be hosted on one or more memory cards which each contain one or more memory chips. For example, the memory cards may include plurality of interconnected flash memory elements (e.g., NAND flash memory elements) mounted on a printed circuit board card (PCB). The virtual environment may include virtual machines that execute applications that transcode the media data from one format to one or more of a plurality of different formats. Because each virtual machine acts like an independent physical machine, a plurality of transcode operations may be performed in parallel on respective virtual machines. By virtualizing the transcode process, the hardware required for transcoding can be reduced relative to using a data center which may include multiples racks of computing equipment dedicated to transcoding the media files.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a virtualized transcoding network) or related data available in the cloud. For example, the virtual transcoding network could execute on a computing system in the cloud and convert received audio and video files into different encodings. In such a case, the virtualized transcoding network could transcode the received files and store the resulting file at a storage location in the cloud. Doing so allows a user to access this information from any computing system attached to a network connected to the cloud (e.g., the Internet).

FIG. 1 illustrates a system 100 including a data center for transcoding media files, according to one embodiment described herein. System 100 includes a network 105, a network switch 110, a plurality of servers 115, a storage switch 120, and a storage-area network (SAN) 125. In one embodiment, system 100 (excluding network 105) may be included within a physical data center. That is, network switch 110, servers 115, storage switch 120, and SAN 125 may be located in the same proximate physical location (e.g., in the same building or complex). For example, the different elements in the data center may be organized into respective chassis that are mounted on one or more racks.

In one embodiment, network 105 provides a communication path between network switch 110 and a client device (not shown). The client device may contain a media file which a content provider wants transcoded from one format to another format. Using network 105, the client device transfers the media file to switch 110 which forwards the file to one of the servers 115. In one embodiment, each server 115 may be capable of performing only one transcode at any given time. For example, if the client device requests that system 100 transcode the media file into three different versions, each of the three servers 115 (assuming the servers 115 are idle) may perform one of the transcodes such that the transcodes are performed concurrently. Alternatively, one of the servers 115 may perform the three transcodes linearly—i.e., one after another. Once the system 100 has performed the transcode, the new media files are transmitted from the network switch 110 to the client device.

In one embodiment, system 100 may not include network 105 or switch 110. For example, a client device may have a direct connection to the servers 115 or the media file may be provided to one of the servers 115 using a storage medium—e.g., CD, DVD, external hard-disk, USB, etc—that is inserted or connected to the servers 115.

Once the media file is received, servers 115 transcode the file to the requested format. Specifically, each of the servers 115 may contain a transcode application (not shown) which, when executed, converts the media file to a media file with a different format. In one embodiment, the servers 115 transcode media files from a raw format into a smaller, compressed format so the media can be stored on a storage medium (e.g., DVD, CD, etc.) or transferred on a distribution network (e.g., cable or television network, an Internet streaming service, etc). For example, the media may be captured by video cameras or audio recorders and stored in a particular format. The content provider may then edit this raw footage to generate the media file (e.g., a movie, soundtrack, etc.). However, the format of the media file may be incompatible with various communication methods used to present or transmit the media. For example, broadcasting the media file using a television network may require a different format than streaming the media file using the Internet or storing the media file onto a DVD. Accordingly, the content provider may use system 100 to transcode the media file into the respective formats required by the individual communication or storage methods.

In one embodiment, the transcode process may be lossless such that transcoding the media file into the compressed format allows the original data to be reconstructed from the compressed format. For example, a single motion picture may be recorded in a DPX format and include thousands of files, as many as 24 audio tracks, files with varying frame resolution that need to be converted into a regional or continental specific format, etc. Based on this collection of DPX data files (which are collectively referred to as the media file), transcode applications on servers 115 compress the DPX formatted files into a desired format—e.g., JPEG2000 or FFmpeg® (a trademark of Fabrice Bellard) which are lossless formats. Another general example of lossless conversion includes converting a file from uncompressed AVI to compressed MPG.

Instead of storing the media file locally at the servers 115, system 100 may store the media file in the SAN 125. For example, the size of the media file, which may include terabytes of data, may exceed the storage capabilities of the individual servers 115. When transcoding the media file, the server 115 selected to transcode the file may perform a plurality of read/write requests (e.g., paging) to the SAN 125 using the SAN switch 120. Each read request retrieves a portion of the media file from SAN 125 which the selected server 115 transcodes into the desired format. The server 115 may then transmit a write request to the SAN 125 which stores the transcoded portion into the SAN 125. The server 115 may then transmit another read request for a different portion of the media file from SAN 125. In this manner, the SAN 125 and the transcode application on server 115 continually exchange portions of the media file until the media file has been completely transcoded. Server 115 and SAN 125 may then use switch 110 and network 105 to transmit the transcoded media file to the client device.

Transcoding media files using system 100 has several drawbacks, however. In one embodiment, SAN 125 includes a plurality of hard-disk drives which store the media files while the servers 115 transcode the files. Because of the limitations of these types of drives, SAN 125 may be able to service approximately 50,000 read/write requests per second. This read/write request maximum may be caused, at least in part, in the write latency of the hard-disk which requires a spindle to travel to a location in the platter where the data is to be retrieved or stored. As a result, the communication path between server 115 and SAN 125 may be a bottleneck for transcoding the media file. Stated differently, the transcode application may be forced to idle if server 115 and SAN 125 cannot transfer the portions of the media file as fast as the transcode application can encode the portions. Moreover, hard-disk drives have moving parts, and thus, may have shorter device life spans than other storage types (e.g., solid-state memory).

Figure 2:
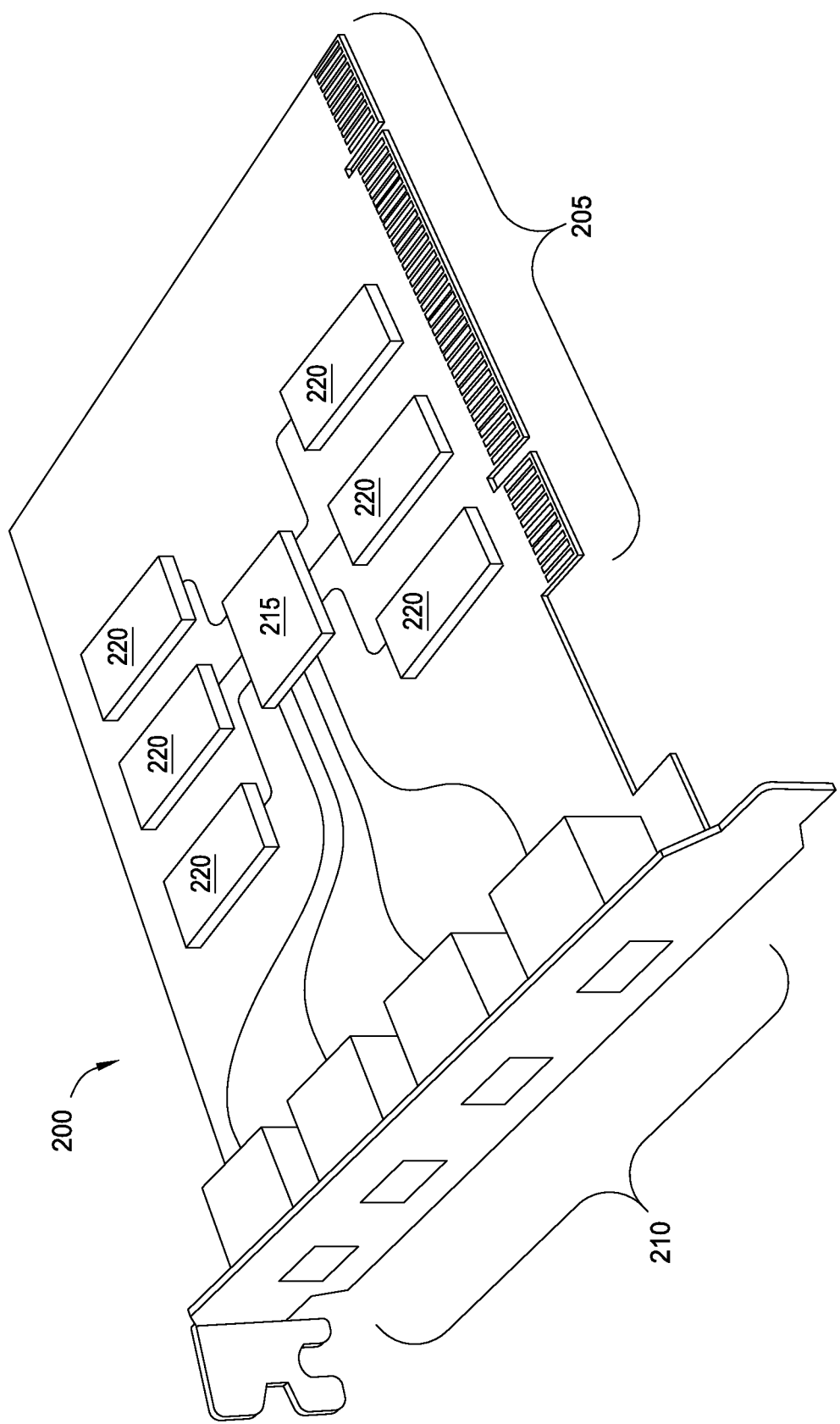
FIG. 2 illustrates a memory card, according to one embodiment described herein.

FIG. 2 illustrates a memory card 200, according to one embodiment described herein. As shown, memory card 200 includes a plurality of integrated circuits (ICs) mounted onto a PCB. At the periphery, the memory card 200 includes an internal interface 205 and an external interface 210. In one embodiment, the internal interface 205 includes a plurality of conductive leads on a male extension of the PCB. The internal interface 205 may be configured to be received into a female receptacle or slot (not shown) that includes conductive elements that correspond to the leads on the internal interface 205. For example, card 200 may be located within a physical chassis that includes a separate PCB (e.g., a motherboard) containing the female receptacle. In one embodiment, the physical chassis may be a computer system, such as a server, personal computer, and the like. Generally, plugging the memory card 200 into the chassis extends the available memory to the computer system included within the chassis as well as any other computer system that may be communicatively coupled to the chassis.

In one embodiment, memory card 200 may use peripheral component interconnect (PCI) or a variant thereof (e.g., PCI-X or PCI-Express) for transferring data between the card 200 and a computer system connected to the internal interface 205. The embodiments described herein, however, are not limited to any particular communication protocol. For example, other serial or parallel data transfer protocols may be used such as Ethernet, FireWire®, InfiniBand®, Fibre Channel, and the like. As will be discussed later, memory card 200 may use the internal interface 205 to transfer media files (or portions of media files) to and from other memory cards 200 mounted in a shared chassis.

The external interface 210 may include a plurality of ports that are adapted to receive wired communication cables. Specifically, the external interface 210 may be exposed at an external surface of the chassis in which the card 200 is mounted while the internal interface 205 is not. In one embodiment, the external interface 210 may be coupled to, for example, a network device for receiving media files from a client device. The external interface 210 is not limited to any particular communication protocol and may use, for example, Ethernet, FireWire®, InfiniBand®, Fibre Channel and the like, for transferring data.

In one embodiment, after receiving a media file via either the external interface 210 or the internal interface 205, memory card 200 may use memory controller 215 to store the received file in one or more of the memory chips 220. Memory controller 215 may include a plurality of electrical wires that permit the controller 215 to read and write data to the memory chips 220. Additionally, memory controller 215 may include control logic for transmitting and receiving data from the internal and external interfaces 205, 210. In one embodiment, memory chips 220 may be communicatively coupled by the controller 215 to create an integrated memory or address space that includes all of the memory chips on the card 200. State differently, even though FIG. 2 illustrates a plurality of separate memory chips 220, the memory controller 215 may be configured to track and control the data stored in the various memory chips 220 to create a shared address space—i.e., to the perspective of an external device, the memory chips 220 behave like a single memory element.

In one embodiment, each memory chip 220 is a solid-state memory element such as a semiconductor integrated circuit. Moreover, the memory chips 220 may be either volatile or non-volatile memory elements. For example, the chips 220 may be RAM such as DRAM, SRAM, CBRAM, RRAM, and the like. Alternatively, the memory chips 220 may read-only memory such as EEPROM. In one embodiment, the memory chips 220 may be Flash memory chips—e.g., either NAND Flash or NOR Flash. Unlike hard-disk drives, solid-state memory chips 220 do not have moving parts such as rotating platters or moving spindles. Accordingly, the memory chips 220 may have shorter latencies and longer expected life spans when compared to hard-disk drives.

Figure 3:
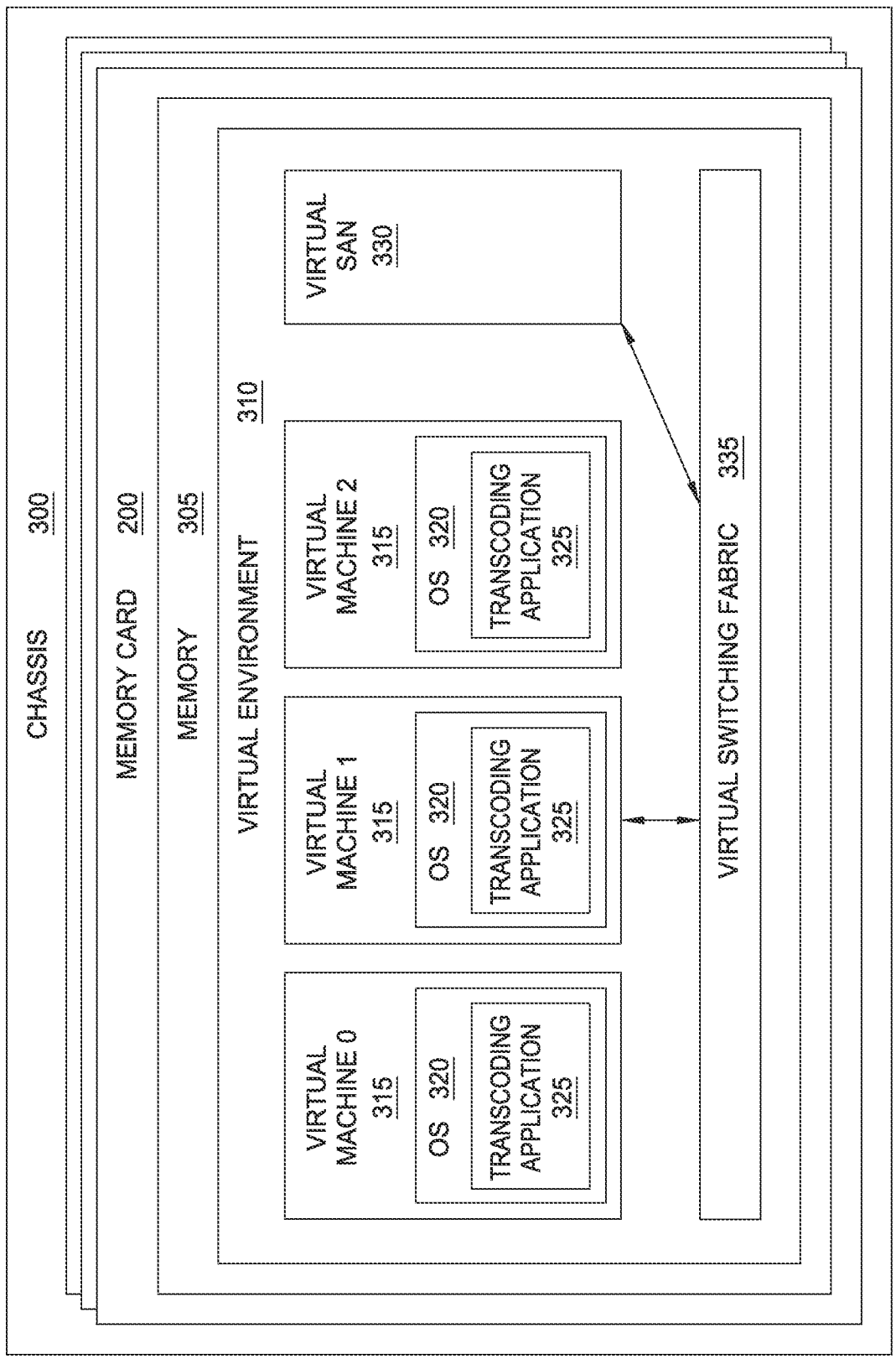
FIG. 3 illustrates a virtual transcoding network in the memory card, according to one embodiment described herein.

FIG. 3 illustrates a virtual transcoding network in the memory card 200, according to one embodiment described herein. As shown, a chassis 300 includes one or more of the memory cards 200 described in FIG. 2. In one embodiment, chassis 300 may be a separate computer system—e.g., server, personal computer, etc.—which includes a plurality of receptacles for coupling to the memory cards 200. Moreover, chassis 300 may provide a back plane communication channel (e.g., a PCI-Express bus) that permits high-speed data communication between the different memory cards 200 mounted in the chassis 300. In addition to providing the back plane for inter-card communication, the computer system in chassis 300 may use the back plane to communicate with the cards 200 directly. For example, chassis 300 may receive a media file which it then transmits, using the back plane, to the card 200. Thus, in this embodiment, memory card 200 may receives the media file using the internal interface coupled to the chassis rather than the external interface.

In one embodiment, the physical dimensions of chassis 300 (or the chassis's form-factor) may be designed to correspond to the standard server-rack configuration. For example, chassis 300 may be a 2 U (two-rack units) device that is approximately 19 inches wide and 3 inches tall. Moreover, chassis 300 may include ancillary devices that may be used to, for example, cool the memory card 200 or provide the card 200 with power.

Each memory card 200 includes memory 305. As shown in FIG. 2, memory 305 may include one or more memory chips 220 that are integrated into the single memory 305. In one embodiment, memory 305 does not include any hard-disk memory elements. In another embodiment, memory 305 may include only solid-state memory elements.

As shown here, memory 305 is used to establish a virtual environment 310. Specifically, a virtualization application is loaded into memory 305 which, when executed, establishes a virtual environment that behaves like a corresponding physical network—e.g., system 100 of FIG. 1. Although not shown, chassis 300 may include one or more processors that are used when executing virtual components in the virtual environment. Once the virtual environment 310 is established, a system administrator may then configure the different components that operate within the virtual environment 310. For example, the virtualization software may permit the administrator to instantiate virtual machines 315 (e.g., Virtual Machine 0, 1 and 2) in the network 310. In one embodiment, virtual machines may be configured similar to the servers 115 in FIG. 1 but with virtual components. The virtual machines 315 include a virtual operating system (OS) 320 which executes the transcoding application 325. In one embodiment, the transcoding application 325 is the same application used by the server 115 in FIG. 1 to encode the media files. Thus, instead of being executed by a physical machine, the transcoding applications 325 are hosted by virtual machines 315 established in the memory card 305. In one embodiment, the virtual machines 315 may use a processor in chassis 300 to execute the transcoding applications 325. That is, virtual machines 315 may have a virtual processor loaded in the memory card but the transcode is executed using the physical processor coupled to the memory card via, e.g., a PCI-e connection.

The virtual environment 310 includes a virtual switching fabric 335 which transfers data between the virtual machines 315 and the virtual SAN 330. For example, once a media file is received by the memory card 200 (e.g., using the external or internal interface), the virtual switching fabric 335 may be responsible for transferring the media file to the virtual SAN 330. In addition, as one of the transcoding applications 325 begins to encode a received media file, the virtual switching fabric 335 may transfer portions of the media file between the virtual SAN 330 and the corresponding virtual machine 315. Generally, the virtual switching fabric 335 may perform similar tasks as network switch 110 and SAN switch 120 shown in FIG. 1. In one embodiment, virtual machines 315 may be independent processes or applications executing in memory 305. Accordingly, the virtual machines 315 may be capable of transcoding respective media files in parallel. For example, Virtual Machine 0, 1, and 2 may perform three transcodes for the same media file concurrently (which results in three different encodings of the media file), or Virtual Machine 0 may transcode a first media file at the same time Virtual Machine 1 is transcoding a second media file. Thus, virtual environment 310 may be configured to facilitate performing multiple transcodes concurrently on any number of virtual machines 315.

As shown in FIG. 3, virtual SAN 330 is implemented using the solid-state memory chips of the memory card 200, and thus, virtual SAN 330 does not include any hard-disk drives in contrast to the physical SAN shown in FIG. 1. By using the solid-state memory chips of a memory card 200 to virtualize the data center shown in FIG. 1, transferring media files (or portions thereof) between the different virtual components (e.g., between the virtual machines 315 and the virtual SAN 330) is performed by the underlying memory controller and memory chips in the card 200. The memory chips may provide access time with less latency than the hard-disk drives used in the physical SAN 125 in FIG. 1. This reduced latency, as well as faster data transfer speeds between the memory chips in card 200, may enable more read/writes per second than system 100. For example, system 100 may permit only 50,000 read/write requests per second while the virtual SAN 330 in the virtual environment 310 can fulfill 3,000,000 read/write requests per second. This drastic improvement may remove, at least in part, the bottleneck discussed earlier. That is, the virtual SAN 330 is able to provide the transcoding application 325 with portions of a media file faster than the physical SAN 125 in FIG. 1. In addition to increasing the data rate between the different components in the network, virtualizing the transcode process may reduce the capital expenditures as well as operating costs relative to system 100 of FIG. 1. Specifically, the functions of the servers, SAN, and switches may performed by virtual models in one or more memory cards 200 rather than in physical systems that may include multiple chassis mounted on multiple racks.

Figure 4:
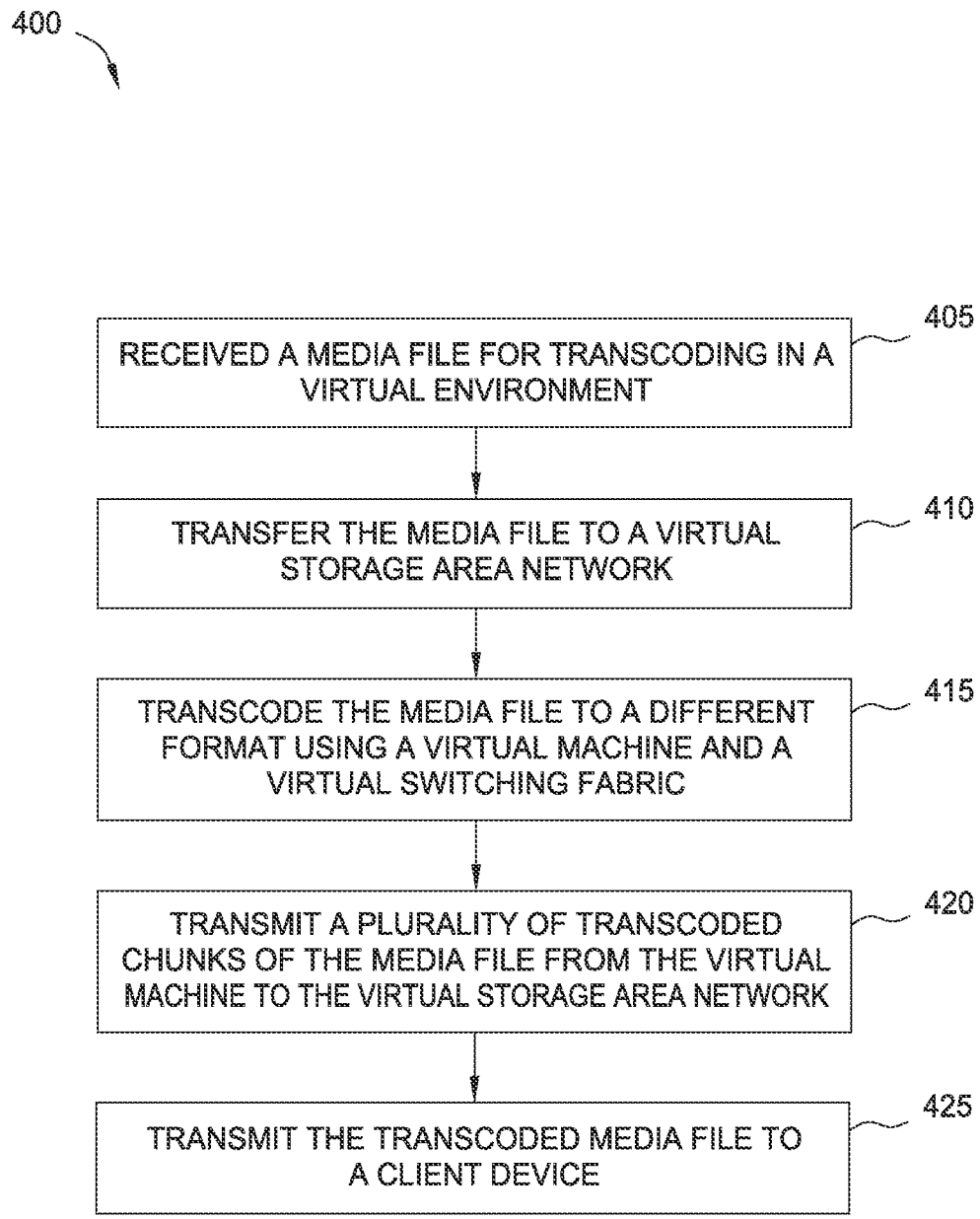
FIG. 4 illustrates a method for transcoding audio or video files in a virtual transcoding network, according to one embodiment described herein.

FIG. 4 illustrates a method 400 for transcoding media files in a virtual transcoding network, according to one embodiment described herein. At block 405, a memory card receives a media file that is to be transcoded from one format to another. In one embodiment, the media file may include a collection of different audio or visual files related to a particular media presentation (e.g., a movie, one or more episodes of a television series, a music video, a video clip, an internet advertisement, an audio presentation, a radio segment, and the like). In another embodiment, the media file may be a single file rather than a collection of files. For example, the media file may have been transcoded previously into a single file but is now being transcoded into a different format. Furthermore, method 400 may use either a lossless transcode algorithm, where the original data may be extracted from the transcoded media file, or a lossy transcode algorithm where some information is lost during the transcode process.

The memory card may receive the media file using one of the ports on the external interface shown in FIG. 2 or via the internal interface. In the case of the former, the memory card may be coupled to a network switch in a wide-area network (e.g., the Internet) which enables client devices to transmit media files to the memory card. In other embodiments, the client device may be directly coupled to the memory card. The client device may be personal computer attached to memory card or the client device may be a computer-readable storage medium (CD, DVD, USB drive, hard-disk drive, and the like) that contains the media file. In the case of the latter, the client device may transfer the media file to the chassis which then uses the internal interface (i.e., a PCI-Express connection) to transfer the media file to the memory card. Once the media file is received, a virtual environment hosted by the memory card may store and process the media file.

At block 410, the virtual environment may store the media file in a virtual SAN using a virtual switching fabric. Generally, the virtual switching fabric contains logic that enables the media file (or portions thereof) to be transmitted to the different virtual components in the virtualized network environment. In one embodiment, the virtual SAN is used to store the entire media file while the virtual switching fabric transfers portions of the media file between the virtual SAN and one or more virtual machines that perform the transcode.

At block 415, one of the virtual machines in the virtual environment transcodes the media file from one format to another format. In one embodiment, each virtual machine includes a transcode application that encodes media files to different formats. The transcode application may receive a chunk of the media file from the virtual SAN, transcode the chunk into a different format, and then, at block 420, transmit the chunk back the virtual SAN. This process of sequentially processing the individual chunks or portions of the media file continues until the entire media file has been transcoded.

At block 425, the memory card transmits the transcoded media file to a client device. Specifically, once the virtual machine completes a transcode, a virtual machine may instruct the virtual switching fabric to transmit the transcoded media file to the client device. At the hardware level, the application establishing the virtual environment may instruct a memory controller on the memory card to transfer the media file using the internal or external interfaces to the client device.

Although method 400 describes transcoding a signal media file, a similar process may be used if multiple media files are transcoded concurrently. For example, the virtual environment may include multiple transcoding applications that each transmit and receive portions of media files in parallel from the virtual SAN.

Figure 5:
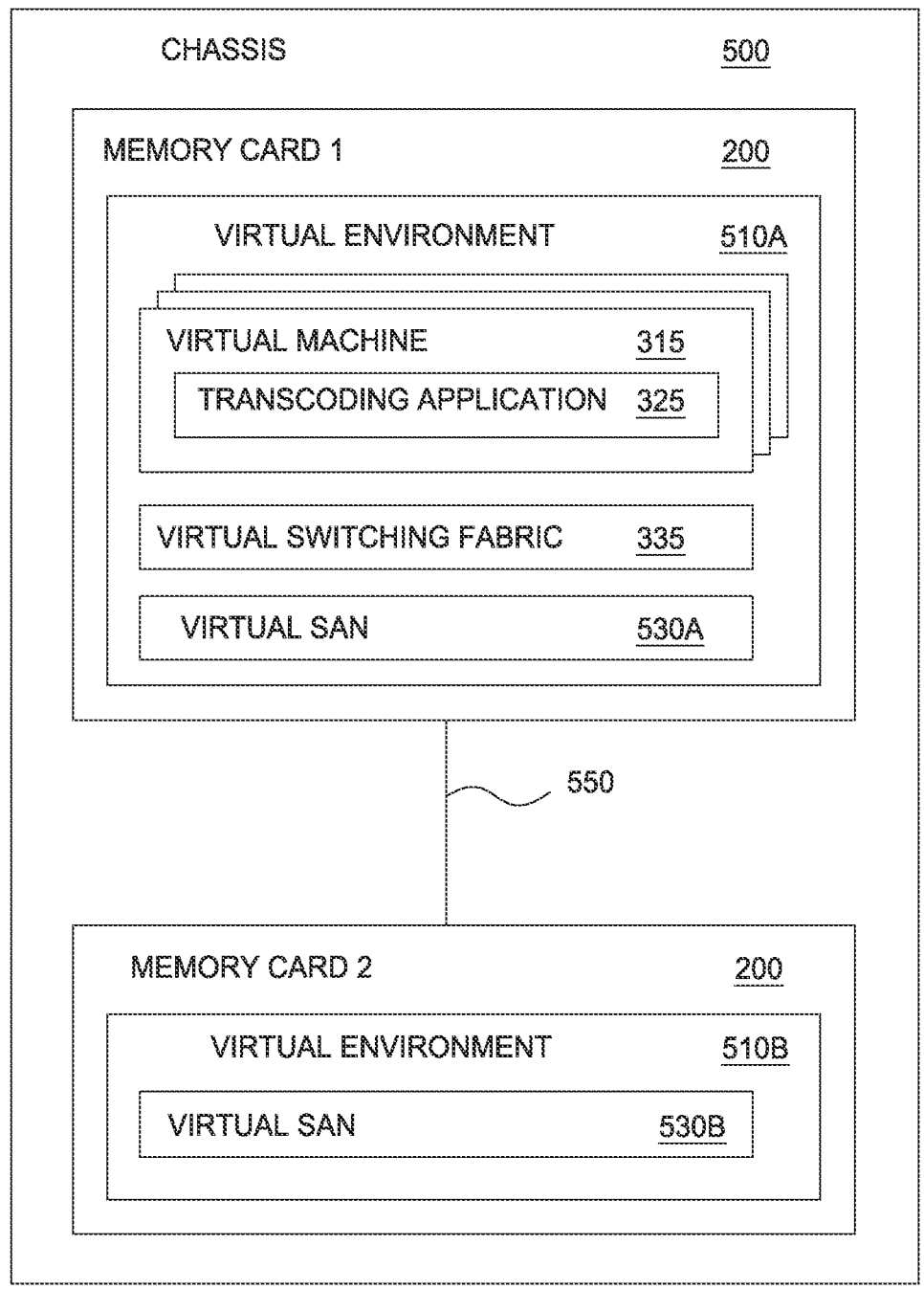
FIG. 5 illustrates a virtual transcoding network that extends across multiple memory cards, according to one embodiment described herein.

FIG. 5 illustrates a virtual transcoding network that extends across multiple memory cards 200, according to one embodiment described herein. As shown, chassis 500 includes two memory cards 200 but may include any number memory cards 200. In contrast to FIG. 3 where the transcoding process is performed on a single memory card 200, chassis 500 includes using a plurality of memory cards for transcoding media files. Although the virtual machines may be configured to execute only one transcode at a time, in other embodiments, the virtual machines may be configured to perform multiple transcodes simultaneously.

Chassis 500 may include a communication backplane or bus 550 that communicatively links the two memory cards 200. In one embodiment, the backplane 550 is a high-speed communication link—e.g., PCI-Express—that enables two cards 200 to share data. The chassis 500 may include, for example, a PCI-Express controller that routes data between the internal interfaces of the cards 200. As more memory cards 200 are added to the chassis 500, the backplane 550 may serve as a shared communication link that interconnects the cards 200.

In one embodiment, each memory card 200 may support a virtual environment 510. As shown, Memory Card 1 hosts virtual environment 510A while Memory Card 2 hosts virtual environment 510B. That is, each memory card 200 may have a separate instance of a network virtualization application in memory which, when executed, establishes a virtual environment. The virtual environments 410 may then be communicatively linked using the backplane 550. Thus, even though each card 200 has a respective instance of a virtual environment, the environments 510A and 510B may be communicatively coupled such that the environments 510A-510B behave like a single virtual environment.

In another embodiment, a virtualization application may establish a single virtual environment 510 that extends across the memory cards 200. That is, the virtual environment 510 may be configured as a single virtual environment where one portion is on Memory Card 1 and another portion is on Memory Card 2. In one embodiment, regardless of the underlying configuration of the virtual environment, to the perspective of an external device the memory cards 200 establish a single virtual environment that has a shared memory space.

Memory constraints of the memory card may limit the total amount of data that may be saved in the virtual environment 510. For example, physical SAN 125 of FIG. 1 may include enough storage elements to store 40 terabytes of data. However, a single memory card 200 may include memory chips that can, for example, store only between 350 gigabytes and 2 terabytes of data. If a single media file for a full-featured film is around 300 gigabytes, a memory card with only 350 gigabytes of storage is able to transcode a single media file at a time. That is, even if the virtual environment includes multiple transcoding applications 325 which can perform multiple transcodes concurrently, the physical limitations of the card 200 may provide the ability to transcode only one media file at a time. By extending the virtual environment 510 to include memory chips in a second memory card 200, the memory resources are increased which many permit the virtual machines 315 to perform multiple transcodes concurrently.

As shown in FIG. 5, the virtual SAN 530 is distributed into two portions—virtual SAN 530A located on Memory Card 1 and virtual SAN 530B located on Memory Card 2. The virtual environment 510 may include logic that stores and maintains the media files in the two virtual SANs 530A-B. In one embodiment, the virtual switching fabric 335 includes routing logic that identifies where different files are stored. As the transcoding applications 325 issue read/write requests to the virtual switching fabric 335, the fabric 335 forwards the request to the appropriate SAN 530 based on the routing logic. If the request is for virtual SAN 530B, the request travels between the memory cards 200 using backplane 550. Data requested from virtual SAN 530A, in contrast, may be retrieved by the switching fabric 335 using local data paths on Memory Card 1. If the backplane 550 uses a communication protocol that can transfer data at substantially the same speed at which the memory cards 200 transfer data internally, using the backplane 550 does not significantly slow down the transcode process relative to transcoding media files using only one memory card 200.

By combining multiple memory cards 200 to create a virtual environment 510 that extends across the cards 200, the memory resource of the network may be expanded to be comparable to the memory space offered by the physical SAN 125 of FIG. 1 but without the drawbacks mentioned previously such as read/write latencies, communication bottlenecks, or reliability issues. In addition, using a virtual environment on a plurality of memory cards may also significantly reduce the costs associated with transcoding.

Although FIG. 5 illustrates distributing the virtual SAN 530 across multiple memory cards 200, the present disclosure is not limited to such. Generally, any of the virtual components may be located on different cards. For example, in one embodiment, chassis 500 may include one memory card that includes only the virtual machines 315 and the virtual switching fabric while any additional memory cards 200 include only distributed portions of the virtual SAN 530. In this manner, memory cards 200 may be added to satisfy the desired size of the virtual SNA—e.g., the virtual SAN 530 can be the same size as the physical SAN 125 in FIG. 1. Alternatively, each card 200 may include a virtual machine 315, a virtual switching fabric 335, and a portion of the virtual SAN 530. In this scenario, each card 200 can transcode a media file concurrently in contrast to the arrangement in FIG. 5 where Memory Card 1 may perform multiple transcodes concurrently while Memory Card 2 is used primarily for storage. One of ordinary skill in the art will recognize the different ways in which the virtual components may be distributed across multiple memory cards. Moreover, multiple chassis may be linked together which may enable additional memory cards 200 to be included in the virtual environment 510.

CONCLUSION

The embodiments presented herein disclose techniques for transcoding media files using a virtualized network environment. This virtual environment may be hosted on one or more memory cards which each contain one or more memory chips. For example, the memory cards may include plurality of interconnected memory elements mounted on a PCB. The virtual environment may include virtual machines that execute applications that transcode the media files from one format to a different format. Because each virtual machine acts like an independent physical machine, a plurality of transcode operations may be performed in parallel on respective virtual machines. By virtualizing the transcode process, the hardware required for transcoding can be reduced relative to using a data center which may include multiples racks of computing equipment dedicated to transcoding the media files.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for transcoding a media file in a virtual environment, comprising:
   storing the media file in the virtual environment, wherein the virtual environment is hosted on one or more memory cards comprising solid-state memory elements;
   transmitting a plurality of portions of the media file from a virtual storage area network (SAN) in the virtual environment to a virtual machine in the virtual environment;

transcoding the plurality of portions of the media file from a first format to a second format using the virtual machine, wherein the portions are transcoded sequentially by the virtual machine; and transmitting the plurality of transcoded portions of the media file from the virtual machine to the virtual SAN.

2. The method of claim 1, further comprising transcoding a different media file using a different virtual machine in the virtual environment in parallel with transcoding the plurality of portions of the media file using the virtual machine.

3. The method of claim 1, wherein transcoding the plurality of portions of the media file from the first format to the second format is lossless.

4. The method of claim 1, wherein the virtual environment comprises a virtual switching fabric that routes the plurality of portions of the media file from the virtual machine to the virtual SAN and routes the transcoded portions of the media file from the virtual machine to the virtual SAN.

5. The method of claim 1, wherein the virtual environment comprising the virtual machine and the virtual SAN is hosted on a single memory card, the single memory card comprising the solid-state memory elements mounted on a printed circuit board (PCB).

6. The method of claim 1, wherein the virtual environment is hosted on at least two memory cards, wherein the virtual machine is hosted on a first one of the at least two memory cards and at least a portion of the virtual SAN is hosted on a second one of the at least two memory cards.

7. The method of claim 1, wherein the media file comprises one or more audio or visual files associated with a media presentation.

8. A computer program product for transcoding a media file in a virtual environment, the computer program product comprising:

one or more memory cards having computer-readable program code embodied therewith, the computer-readable program code configured to:

store the media file in the virtual environment, wherein the virtual environment is hosted on the one or more memory cards comprising solid-state memory elements;

transmit a plurality of portions of the media file from a virtual SAN in the virtual environment to a virtual machine in the virtual environment;

transcode the plurality of portions of the media file from a first format to a second format using the virtual machine, wherein the portions are transcoded sequentially by the virtual machine; and transmit the plurality of transcoded portions of the media file from the virtual machine to the virtual SAN.

9. The computer program product of claim 8, wherein the computer-readable program code further configured to:

transcode a different media file using a different virtual machine in the virtual environment in parallel with transcoding the plurality of portions of the media file using the virtual machine.

10. The computer program product of claim 8, wherein transcoding the plurality of portions of the media file from the first format to the second format is lossless.

11. The computer program product of claim 8, wherein the virtual environment comprises a virtual switching fabric that routes the plurality of portions of the media file from the virtual machine to the virtual SAN and routes the transcoded portions of the media file from the virtual machine to the virtual SAN.

12. The computer program product of claim 8, wherein the virtual environment comprising the virtual machine and the virtual SAN is hosted on a single memory card, the single memory card comprising the solid-state memory elements mounted on a PCB.

13. The computer program product of claim 8, wherein the virtual environment is hosted on at least two memory cards, wherein the virtual machine is hosted on a first one of the at least two memory cards and at least a portion of the virtual SAN is hosted on a second one of the at least two memory cards.

14. A chassis, comprising:

a computer processor; and a memory card comprising one or more solid-state memory elements storing a program that, when executed on the computer processor, performs an operation for transcoding a media file in a virtual environment, the operation comprising:

storing the media file in the virtual environment, wherein the virtual environment is hosted, at least in part, on the memory card;

transmitting a plurality of portions of the media file from a virtual SAN in the virtual environment to a virtual machine in the virtual environment;

transcoding the plurality of portions of the media file from a first format to a second format using the virtual machine, wherein the portions are transcoded sequentially by the virtual machine; and transmitting the plurality of transcoded portions of the media file from the virtual machine to the virtual SAN.

15. The chassis of claim 14, wherein the operation further comprises transcoding a different media file using a different virtual machine in the virtual environment in parallel with transcoding the plurality of portions of the media file using the virtual machine.

16. The chassis of claim 14, wherein the memory elements of the memory card are mounted on a PCB and the memory card comprises a male interface coupled to a female receptacle in the chassis.

17. The chassis of claim 14, wherein the virtual environment comprising the virtual machine and the virtual SAN is hosted only on the single memory card.

18. The chassis of claim 14, further comprising another memory card comprising solid-state memory elements, wherein the another memory card also hosts the virtual environment.

19. The chassis of claim 18, wherein the memory card hosts the virtual machine and a first portion of the virtual SAN, and wherein the another memory card hosts a different virtual machine of the virtual environment and a second portion of the virtual SAN.

20. The chassis of claim 18, wherein the memory card hosts the virtual machine and does not host the virtual SAN, and wherein the another memory card hosts at least a portion of the virtual SAN and does not host any virtual machine in the virtual environment.

* * * * *